United States Patent Office

3,720,672
Patented Mar. 13, 1973

3,720,672
PREPARATION OF 2-METHOXY-3-ISOBUTYLPYRAZINE
Ron G. Buttery, Richmond, Richard M. Seifert, El Cerrito, Robert E. Lundin, Berkeley, and Dante G. Guadagni, Moraga, Calif., assignors to the United States of America as represented by the Secretary of Agriculture
No Drawing. Original application Apr. 18, 1969, Ser. No. 818,471, now Patent No. 3,630,750. Divided and this application Jan. 7, 1971, Ser. No. 104,778
Int. Cl. C07d 51/76
U.S. Cl. 260—250 R  3 Claims

ABSTRACT OF THE DISCLOSURE

Leucine amide is reacted with glyoxal to produce 2-hydroxy-3-isobutylpyrazine, and this intermediate is methylated to yield the new compound 2-methoxy-3-isobutylpyrazine. This compound exhibits an intense aroma of freshly-chopped green bell peppers, and is useful for flavoring food products.

---

This is a division of our co-pending application Ser. No. 818,471, filed Apr. 18, 1969, now Pat. 3,630,750.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of new methoxypyrazine derivatives which are especially useful for flavoring food products. The objects of the invention also include methods for preparing and utilizing these compounds. Further objects of the invention will be evident from the following description wherein parts and percentages are by weight unless otherwise specified.

One aspect of this invention concerns the new compound 2-methoxy-3-isobutylpyrazine, which has the structure

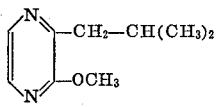

This compound (hereinafter referred to as MIP) exhibits an intense odor typical of freshly-chopped green bell pepper, and can be used in minor proportions for flavoring food products such as ketchup, gravies and sauces, vinegar, soups, salad dressings and marinades, cheeses, aspic and other gelled products, pizza mixes and sauces, pilafs, pickles and relishes, crackers, potato chips, corn chips, tortillas, and meat products including sausages, hamburger, meat loaves, stews, hashes, and the like.

In using MIP as a flavoring agent, it is incorporated in the food in the same way as one would incorporate any other flavoring or seasoning agent. Because of its intense flavoring value, MIP is ordinarily employed in a very minor proportion, for example, in a concentration of about 0.001 to 1 part per million. It is obvious, however, that there is nothing critical about the concentration which is used; it is simply a matter of attaining a desired flavor level appropriate to the food in question.

MIP may be added directly to the food to be flavored, or it may be first incorporated with a diluent to increase its bulk so that small amounts of the compound may be accurately metered into the food. As the diluent, one may use liquid or solid carriers such as water, ethyl alcohol, glycerol, edible fats or oils, starch, sorbitol, salt, sugar, gelatin, flour, citric acid, powdered skim milk, corn syrup solids, or other non-toxic substance compatible with the material to be flavored.

A flavoring composition useful for flavoring meat dishes and in general cookery, may be prepared, for example, by mixing the following ingredients:

MIP, about 0.001 to 1 part
Anti-caking agent (such as magnesium carbonate, calcium carbonate, calcium phosphate, or calcium silicate), about 1 to 2 parts
Sodium chloride, sufficient to give a total of 100 parts.

It is, of course, within the compass of the invention to use MIP in combination with other flavoring agents. For example, one may mix a carrier with MIP and with a known flavoring agent such as monosodium glutamate, onion powder, garlic powder, black pepper, paprika, or dried herbs such as parsley, oregano, celery, sage, and the like.

MIP dissolves readily in water, and a flavoring composition in liquid form may be prepared, for example, by dissolving about 0.01 to 1 part MIP in 1000 parts of sterile distilled water.

We have ascertained that MIP is present in green bell peppers (*Capsicum annuum* var. *grossum*, Sendt) and its presence therein may be demonstrated by procedures of distillation and chromatography. However, it is to be emphasized that prior to this invention MIP was not known to exist in green bell peppers, or elsewhere for that matter.

A particular advantage of the invention is that it enables the provision of MIP in pure form. In this state, MIP has high and uniform flavoring power and is free from extraneous substances, so that it can be advantageously used, even in very minor proportion, for the effective flavoring of food products. In the state in which MIP exists in distillates of green bell peppers, it is too dilute to be effective for flavoring applications. Also, such distillates vary widely in the flavor characteristics so that they cannot be depended upon to yield uniformly flavored food products.

Another phase of the invention concerns the salts of MIP. Since MIP is an organic base, it is capable of forming salts. Indeed, these salts constitute a valuable form of MIP in that they exhibit low volatility and hence can be kept for long periods of time without loss of MIP. As in the case of other organic bases, the salts of MIP are readily prepared by contacting MIP with an acid. Usually hydrochloric acid is employed, but this is by no means critical and one can use other acids such as sulphuric, phosphoric, acetic, citric, fumaric, tartaric, etc.

When the salt is to be used, the MIP is readily released therefrom by contact with a basic substance such as sodium bicarbonate, sodium carbonate, calcium hydroxide, sodium hydroxide, potassium hydroxide, potassium carbonate, or the like. Alternatively, the salts of MIP can be used as such to flavor foods. They are effective in such flavoring applications because MIP is a very weak base, hence is readily freed from its salts on contact with materials having basic or buffering properties such as are normally present in many foods. In utilizing the salts of MIP directly as flavoring agents, they are incorporated into the food to be flavored in the same manner as explained hereinabove in connection with MIP in the free base form. In sum, the salts, as such or in a carrier, are incorporated in the food in the amount which yields the desired flavor. Moreover, flavoring compositions can be formed with the salts just as hereinabove explained with MIP itself.

EXAMPLES

The invention is further demonstrated by the following illustrative examples.

Example 1—Synthesis of MIP

L-leucine amide (3.9 g.) dissolved in methanol (30 ml.) and water (150 ml.) was cooled to −10° C. Glyoxal di(sodium bisulfite) (8.0 g.) was added to this solution and dissolved by stirring. Sodium hydroxide (3.0 g.) in water (10 ml.) was then added and the mixture stirred for 1 hour, keeping the temperature below −10° C. It was then allowed to warm to room temperature and stirred for 2 more hours. The solution was then neutralized with 12 N hydrochloric acid (3.75 ml.) and taken to dryness under vacuum at 50° C. The solid residue was extracted with boiling chloroform (4× 75 ml.). Removal of the chloroform under vacuum gave crystalline 2-hydroxy-3-isobutylpyrazine (3.2 g.). Infrared absorption and mass spectra of this product were consistent with that expected for this structure. A sample recrystallized from ethyl acetate had M.P. 90–92.5° C.

2-hydroxy-3-isobutylpyrazine (1.52 g.) in ether (30 ml.) was methylated by addition of a dry ether (75 ml.) solution of diazomethane (about 1 g.), keeping the mixture cooled by an ice bath during the addition and for a further 20 minutes. The mixture was then allowed to warm to room temperature over the next 20 minutes and the excess ether and diazomethane removed on a steam bath to give crude MIP (1.58 g.). Preparative gas chromatography, using a 10 ft. long x ¼ inch O.D. aluminum column packed with methyl silicone oil coated on a diatomaceous support, column temperature 160° C., gave the pure 2-methoxy-3-isobutylpyrazine (0.49 g.). The mass spectrum of this compound (above mass 40, intensities in parenthesis with base peak taken as 100) showed a molecular ion at 166 (3.5), major ions at 124 (100), 41 (21), 94 (20), 151 (16), 43 (11), 95 (11), 53 (11), 42 (11), 93 (10), 81 (9), 125 (8). Its infrared absorption spectrum (neat, absorption maxima in microns) showed strong maxima at 3.39, 3.43, 3.50, 6.49, 6.85, 6.9, 7.2, 7.7, 8.6, 9.9, medium maxima at 3.28, 3.46, 7.4, 8.4, 9.4, 11.8, and weak maxima at 3.33, 6.34, 7.9, 8.1, 9.2, 10.5, 10.8, 11.2, 13.3.

Green bell peppers were chopped and subjected to vacuum steam distillation to recover a volatile oil in a yield of about 1 part per 1,000,000 parts of peppers. The oil was fractionted by GLC. The major component was found by IR and mass spectra to be identical with MIP synthesized as described above.

Example 2.—Aroma evaluation

Synthetic MIP, prepared as described in Example 1, was subjected to organoleptic evaluation, using a trained panel of 20 judges. The odor threshold in water solution was found to be 2 parts per $10^{12}$ parts of water.

The threshold values of various known odorous compounds were determined in the same manner, and are included in the following table. It is evident from this data that MIP exhibits an extraordinarily low odor threshold. This, of course, indicates that MIP is effective as a flavoring agent even in minute concentrations.

| Compound: | Odor threshold (pts. per $10^{12}$ pts. $H_2O$) |
| --- | --- |
| MIP | 2 |
| Methyl mercaptan | 20 |
| β-Ionone | 50 |
| 2,4-decadienal | 70 |
| 2,6-cis-nonadienal | 100 |
| Ethyl 2-methylbutyrate | 100 |
| Amyl acetate | 2,000 |
| Cinnamic aldehyde | 50,000 |
| Benzaldehyde | 350,000 |
| Ethyl acetate | 500,000 |

Having thus described our invention, we claim:

1. A method for preparing 2-methoxy-3-isobutylpyrazine which comprises
   (a) reacting leucine amide with glyoxal to produce 2-hydroxy-3-isobutylpyrazine, and
   (b) methylating the aforesaid intermediate to produce 2-methoxy-3-isobutylpyrazine.
2. 2-methoxy-3-isobutylpyrazine.
3. A salt of 2-methoxy-3-isobutylpyrazine with an acid of the group consisting of hydrochloric, sulphuric, phosphoric, acetic, citric, fumaric, and tartaric acids.

References Cited

UNITED STATES PATENTS 3,328,402  6/1967  Winter _____ 260—250 R

NICHOLAS S. RIZZO, Primary Examiner

U.S. Cl. X.R.

99—140 R